United States Patent
Einberg et al.

(10) Patent No.: US 12,026,999 B2
(45) Date of Patent: Jul. 2, 2024

(54) AUTHENTICATING WITH AN AUTHENTICATION SERVER FOR REQUESTING ACCESS TO A PHYSICAL SPACE

(71) Applicant: ASSA ABLOY AB, Stockholm (SE)

(72) Inventors: Fredrik Einberg, Huddinge (SE); Fredrik Lindersson, Täby (SE); Anders Wallbom, Täby (SE)

(73) Assignee: ASSA ABLOY AB, Stockholm (SE)

(*) Notice: Subject to any disclaimer, the term of this patent is extended or adjusted under 35 U.S.C. 154(b) by 170 days.

(21) Appl. No.: 17/768,176

(22) PCT Filed: Oct. 14, 2020

(86) PCT No.: PCT/EP2020/078903
§ 371 (c)(1),
(2) Date: Apr. 11, 2022

(87) PCT Pub. No.: WO2021/074224
PCT Pub. Date: Apr. 20, 2021

(65) Prior Publication Data
US 2023/0316831 A1 Oct. 5, 2023

(30) Foreign Application Priority Data
Oct. 17, 2019 (SE) .................. 1951173-2

(51) Int. Cl.
*G07C 9/00* (2020.01)
*G07C 9/23* (2020.01)
(Continued)

(52) U.S. Cl.
CPC ..... *G07C 9/00182* (2013.01); *G07C 9/00563* (2013.01); *G07C 9/00571* (2013.01);
(Continued)

(58) Field of Classification Search
CPC ............ G07C 9/00182; G07C 9/00563; G07C 9/00571; G07C 9/00857; G07C 9/23;
(Continued)

(56) References Cited

U.S. PATENT DOCUMENTS 11,823,511 B2 * 11/2023 Strömberg ......... G07C 9/00309
2014/0002236 A1 1/2014 Pineau et al.
(Continued)

FOREIGN PATENT DOCUMENTS

EP 2743868 6/2014
WO WO 2015/082603 6/2015
(Continued)

OTHER PUBLICATIONS

Official Action for Sweden Patent Application No. 1951173-2, dated Oct. 27, 2022, 7 pages.
(Continued)

*Primary Examiner* — Andrew W Bee
(74) *Attorney, Agent, or Firm* — Schwegman Lundberg & Woessner, P.A.

(57) ABSTRACT

According to a first aspect, it is provided a method for requesting access to a physical space secured by a lock. The method is performed in a mobile device of a user and comprises the steps of: authenticating the mobile device with an authentication server, resulting in a token, being a data item, indicating one or more access groups to which the user belongs, wherein the token is cryptographically signed by the authentication server; storing the token in the mobile device; obtain a lock identifier of the lock; and transmitting an access request to an access control device, the access request comprising the token and the lock identifier.

23 Claims, 2 Drawing Sheets

(51) Int. Cl.
*G07C 9/25* (2020.01)
*G07C 9/27* (2020.01)
*H04W 12/06* (2021.01)

(52) U.S. Cl.
CPC .......... *G07C 9/00857* (2013.01); *G07C 9/23* (2020.01); *G07C 9/25* (2020.01); *G07C 9/27* (2020.01); *G07C 2009/0019* (2013.01); *G07C 2009/0023* (2013.01); *G07C 2009/00246* (2013.01); *G07C 2009/00865* (2013.01); *G07C 2009/0088* (2013.01); *G07C 2209/08* (2013.01); *H04W 12/068* (2021.01)

(58) Field of Classification Search
CPC .... G07C 9/25; G07C 9/27; G07C 2009/0019; G07C 2009/0023; G07C 2009/00246; G07C 2009/00865; G07C 2009/0088; G07C 2209/08
See application file for complete search history.

(56) References Cited

U.S. PATENT DOCUMENTS

| | | | |
|---|---|---|---|
| 2014/0365781 | A1 | 12/2014 | Dmitrienko et al. |
| 2016/0014131 | A1* | 1/2016 | Neafsey .............. H04W 12/082 713/171 |
| 2016/0358397 | A1 | 12/2016 | Kristensen et al. |
| 2018/0262891 | A1 | 9/2018 | Wu et al. |
| 2018/0276922 | A1 | 9/2018 | Klink et al. |
| 2018/0375849 | A1 | 12/2018 | Koskimies et al. |
| 2019/0025873 | A1 | 1/2019 | Goodrich et al. |
| 2019/0028478 | A1* | 1/2019 | Love ..................... H04L 63/102 |
| 2019/0080075 | A1 | 3/2019 | Ekberg |
| 2019/0236869 | A1 | 8/2019 | Kazerani et al. |

FOREIGN PATENT DOCUMENTS

| | | | | |
|---|---|---|---|---|
| WO | WO-2016068650 A1 * | 5/2016 | ............. | E05B 47/00 |
| WO | WO 2018/160863 | 9/2018 | | |

OTHER PUBLICATIONS

Official Action for Sweden Patent Application No. 1951173-2, dated May 12, 2020, 9 pages.

Official Action for Sweden Patent Application No. 1951173-2, dated Aug. 25, 2021, 6 pages.

International Search Report and Written Opinion for International (PCT) Patent Application No. PCT/EP2020/078903, dated Jan. 12, 2021, 14 pages.

Written Opinion of the International Preliminary Examining Authority for International (PCT) Patent Application No. PCT/EP2020/078903, dated Sep. 9, 2021, 7 pages.

International Preliminary Report on Patentability for International (PCT) Patent Application No. PCT/EP2020/078903, dated Jan. 10, 2022, 16 pages.

* cited by examiner

AUTHENTICATING WITH AN AUTHENTICATION SERVER FOR REQUESTING ACCESS TO A PHYSICAL SPACE

CROSS REFERENCE TO RELATED APPLICATIONS

This application is a national stage application under 35 U.S.C. 371 and claims the benefit of PCT Application No. PCT/EP2020/078903 having an international filing date of Oct. 14, 2020, which designated the United States, which PCT application claimed the benefit of Sweden Patent Application No. 1951173-2 filed Oct. 17, 2019, the disclosure of each of which are incorporated herein by reference.

TECHNICAL FIELD

The present disclosure relates to the field of authentication and in particular to authentication with an authentication server for access to a physical space which is secured by a lock.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic key stored on a special carrier (fob, card, etc.) or in a smartphone. The electronic key and electronic lock can e.g. communicate over a wireless interface. Such electronic locks provide a number of benefits, including improved flexibility in management of access rights, audit trails, key management, etc.

However, management of access rights for electronic keys can be complex and time consuming, especially for large organisations where access rights are managed for many people and many locks. This complexity is also a security risk, since large complexity can lead to mistakes, which can lead to security risks.

SUMMARY

One objective is to improve convenience and security for managing access rights for electronic keys in mobile devices.

According to a first aspect, it is provided a method for requesting access to a physical space secured by a lock. The method is performed in a mobile device of a user and comprises the steps of: authenticating the mobile device with an authentication server, resulting in a token, being a data item, indicating one or more access groups to which the user belongs, wherein the token is cryptographically signed by the authentication server; storing the token in the mobile device; obtain a lock identifier of the lock; and transmitting an access request to an access control device, the access request comprising the token and the lock identifier.

The one or more access groups may also be used for access to computer-based assets.

The token may comprise a validity time of the token.

The method may further comprise the step of renewing validity of the token prior to it expiring.

The step of authenticating may comprise receiving user input for authentication data and providing the authentication data to the authentication server.

The user input may comprise a password.

The step of authenticating may comprise collecting biometric data of the user.

In the step of authenticating, the authentication server may be a single sign-on server.

The token may be in a format according to JavaScript Object Notation Web Token, JWT.

The step of obtaining a lock identifier may be based on short-range wireless communication.

According to a second aspect, it is provided a mobile device for requesting access to a physical space secured by a lock. The mobile device is associated with a user and comprises: a processor; and a memory storing instructions that, when executed by the processor, cause the mobile device to: authenticate the mobile device with an authentication server, resulting in a token being a data item indicating one or more access groups to which the user belongs, wherein the token is cryptographically signed by the authentication server; store the token in the mobile device; obtain a lock identifier of the lock; and transmit an access request to an access control device, the access request comprising the token and the lock identifier.

The one or more access groups may also be used for access to computer-based assets.

The token may comprise a validity time of the token.

The mobile device may further comprise instructions that, when executed by the processor, cause the mobile device to renew validity of the token prior to it expiring.

The step instructions to authenticate may comprise instructions that, when executed by the processor, cause the mobile device to receive user input for authentication data and provide the authentication data to the authentication server.

The user input may comprise a password.

The instructions to authenticate may comprise instructions that, when executed by the processor, cause the mobile device to collect biometric data of the user.

The authentication server may be a single sign-on server.

The token may be in a format according to JavaScript Object Notation Web Token, JWT.

The instructions to obtain a lock identifier may comprise instructions that, when executed by the processor, cause the mobile device to obtain the lock identifier is based on short-range wireless communication.

According to a third aspect, it is provided a computer program requesting access to a physical space secured by a lock. The computer program comprises computer program code which, when run on a mobile device associated with a user causes the mobile device to: authenticate the mobile device with an authentication server, resulting in a token being a data item indicating one or more access groups to which the user belongs, wherein the token is cryptographically signed by the authentication server; store the token in the mobile device; obtain a lock identifier of the lock; and transmit an access request to an access control device, the access request comprising the token and the lock identifier.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
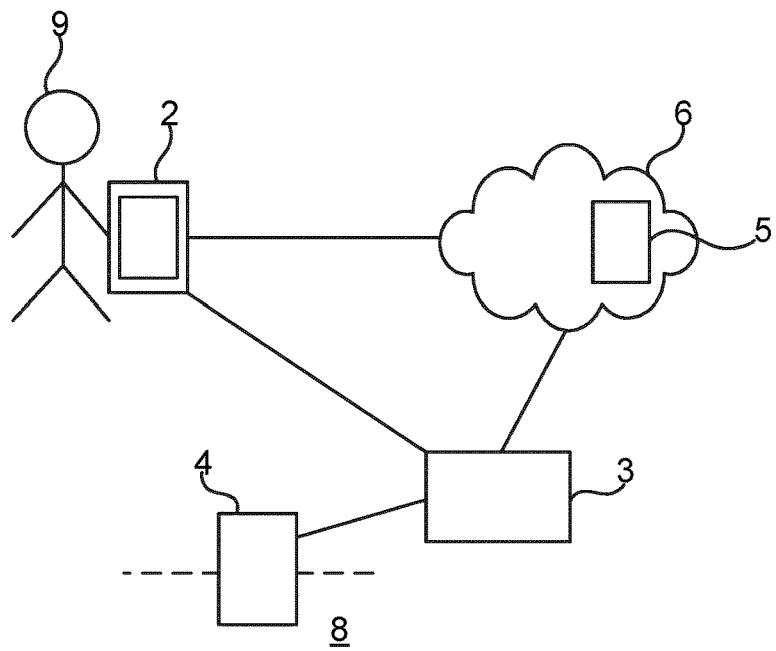
FIG. 1 is a schematic diagram illustrating an environment in which embodiments presented herein can be applied.

FIG. 1 is a schematic diagram illustrating an environment in which embodiments presented herein can be applied. A lock 4 is provided to secure access to a physical space 8. The physical space 8 can e.g. be or be part of a home, office, factory, garden, drawer or any other suitable physical space which can be secured by an electronic lock 4 provided by a door, window, gate, hatch, drawer, etc.

The lock 4 is an electronic lock and can be opened on command from an access control device 3. Optionally, the access control device 3 is integral to the lock 4, i.e. the access control device 3 and the lock 4 are combined in a single device. Alternatively, the access control device 3 is implemented as a standalone device or on one or more local or remote servers, e.g. using a cloud service. As explained in more detail below, a mobile device 2 of a user 9 communicates with the access control device 3 to request access, i.e. to unlock the lock 4. The mobile device 2 may be implemented as part of a mobile phone, a smartphone, a key fob, wearable device, smart phone case, access card, electronic physical key, etc. The mobile device 2 acts as an electronic key for the user 9 to unlock the lock 4.

The mobile device 2 can communicate with the access control device 3 over local communication link. The local communication link can be any suitable short-range wired or short-range wireless communication, e.g. using Bluetooth, Bluetooth Low Energy (BLE), any of the IEEE 802.15 standards, Radio Frequency Identification (RFID), Near Field Communication (NFC).

The mobile device 2 is also connected to a wide area network (WAN) 6 over a WAN link. The WAN 6 can e.g. be based on Internet Protocol (IP) over WiFi or any suitable cellular network standard, and can form part of the Internet.

An authentication server 5 is provided, connected to the WAN 6. This is often termed that the authentication server 5 forms part of the cloud, whereby the authentication server 5 is here illustrated forming part of the WAN 6. The authentication server 5 can be implemented as a single server device or as part of multiple server devices, as known in the art per se, e.g. in a so-called cloud implementation.

The authentication server 5 can be a single-sign on server, e.g. conforming to OpenID or any other suitable scheme. The authentication server 5 can be used for access to network services, such as any one or more of network login services (e.g. corporate network), web services, remote storage services, etc. Additionally, as detailed below, the authentication server 5 is here also used for access to a physical space 8 secured by the lock 4.

Figure 2:
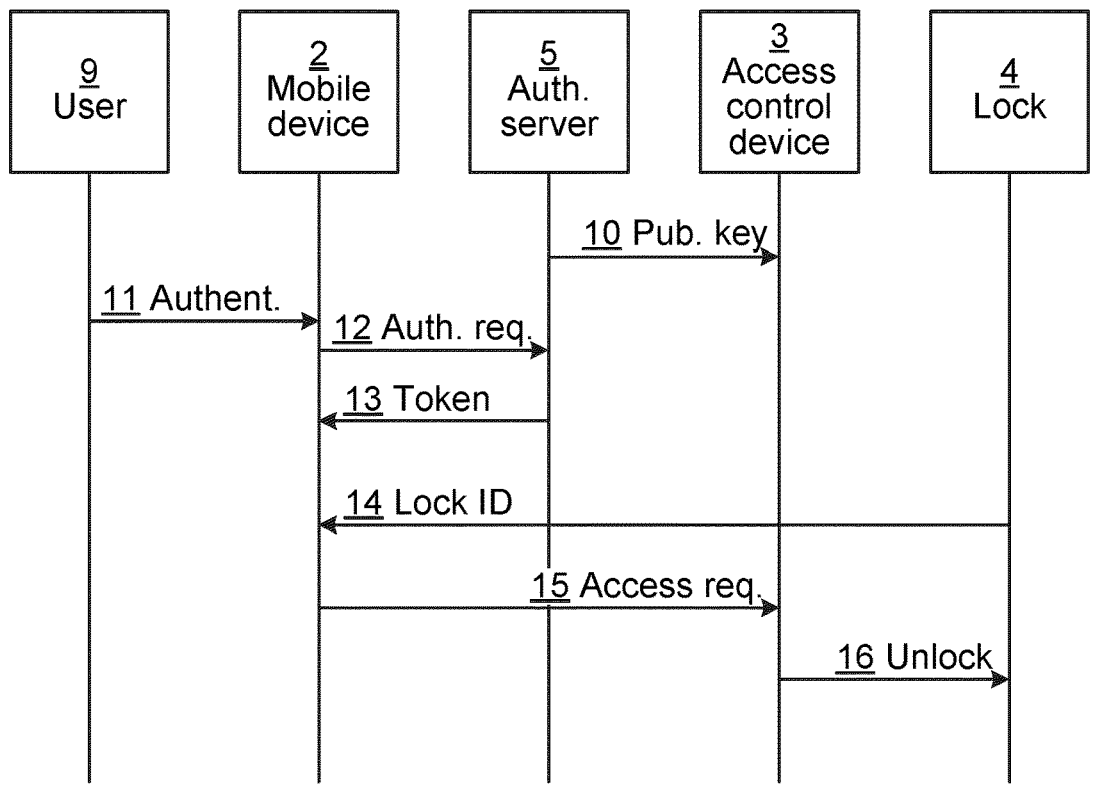
FIG. 2 is a sequence diagram illustrating communication between various entities of embodiments which can be applied in the environment of FIG. 1.

FIG. 2 is a sequence diagram illustrating communication between various entities of embodiments which can be applied in the environment of FIG. 1.

First of all, the authentication server 5 provides a public key 10 to the access control device 3. This will allow the access control device to verify cryptographic signatures by the authentication server 5.

The user 9 triggers an authentication process with the mobile device 2 by providing appropriate user authentication user input 11, e.g. a username and password and/or biometric credentials (e.g. face, finger, iris, retina, etc.). The mobile device sends an authentication request 12 comprising the user input to the authentication server 5, in other words a login request.

If the authentication is successful, the authentication server 5 responds with a token 13. Otherwise, if the authentication is not successful, the sequence ends. The token 13 contains an indication of one or more access groups to which the user 9 belongs and a validity time for the token. These access groups are used to control physical access. For instance, in an office setting, a user can belong to door group 1 and door group 2. Door group 1 is defined elsewhere in the system to map to set of doors in the building. Door group 2 is mapped to another set of doors. The two sets may overlap, so that there can be doors that map to both door groups. The user has access to all the doors or locks that are mapped to any of the door groups present in the token.

For instance, in a residential multifamily setting, an access group could be tenant X or the landlord. Tenant X could be mapped to a particular apartment door and common facilities, while the landlord could be mapped to all doors in the building.

The mobile device 2 stores the token 13 until it is used. At some point in time, the user 9 approaches the lock 4 and obtains the lock ID 14 from the lock 4 over a local communication link. The mobile device 2 is now ready to send an access request 15 to the access control device 3. The access request 15 comprises the token 13 and the lock ID 14. The access control device 3 is now ready to check whether to unlock the lock 4.

The access control device 3 verifies (using the public key 10) that the token 13 (including its access group(s) and validity time) is validly signed by the authentication server 5. The access control device 3 also checks the validity time of the token to ensure that the validity time has not expired. The one or more access groups are then extracted from the token 13. If the lock id is mapped to at least one of the one or more access groups (e.g. company x), this indicates that the user 9 of the mobile device 2 is allowed to unlock the lock and the access request is granted. The access control device 3 obtains (from local or remote storage) a mapping between access groups and lock IDs, allowing the access control device to determine what lock ID belongs to certain access group. Each lock ID can be mapped to zero, one or more access groups. Optionally, there is an intermediate group of lock groups. In that case, there is a first mapping between the lock id and zero, one or more lock groups, as well as a second mapping between each lock group and zero, one or more access groups. In any case, the access control device is configured to determine if the lock id is mapped to the one or more access groups of the token.

Once access is granted, the access control device 3 sends an unlock command 16 to the lock 4.

Figure 3:
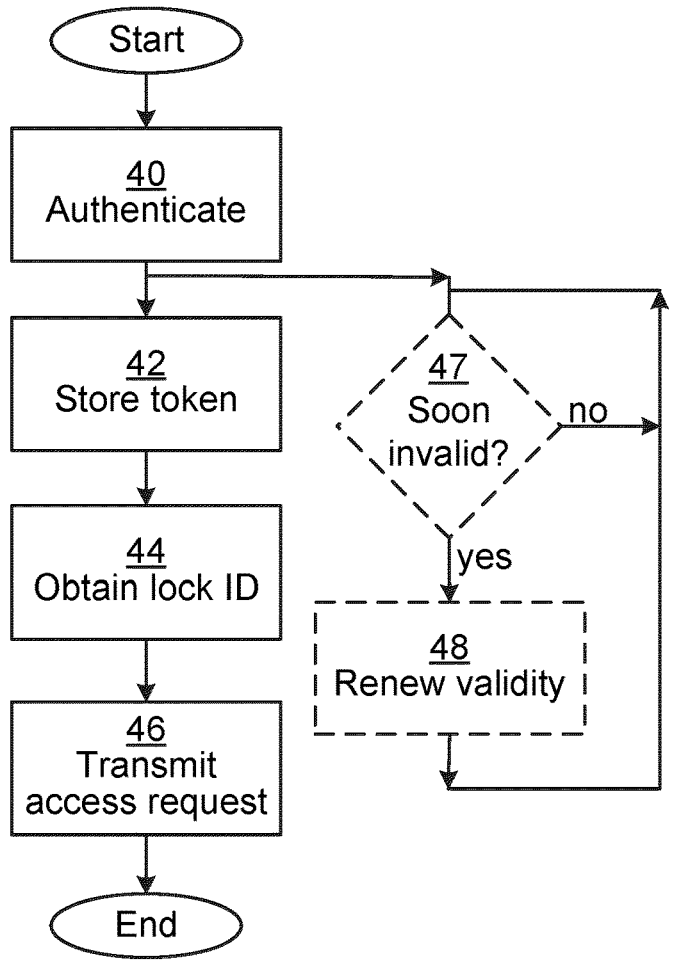
FIG. 3 is a flow chart illustrating embodiments of methods for requesting access to a physical space secured by a lock.

FIG. 3 is a flow chart illustrating embodiments of methods for requesting access to a physical space secured by a lock. The method is performed in the mobile device. The method essentially corresponds to actions performed by the mobile device in the sequence diagram of FIG. 2, described above.

In an authenticate step 40, the mobile device authenticates the mobile device with an authentication server. As part of the authentication, the user device can receive user input for authentication data to be included in the authentication request (12 of FIG. 2) to the authentication server. The authentication data can e.g. comprise a username and password and/or biometric credentials (e.g. face, finger, iris, retina, etc.).

The authentication, if deemed successful by the authentication server, results in a token (being a data item) indicating one or more access groups to which the user belongs. In other words, there is at least one association with the user and an access group. Each access group is configured to be associated with a plurality of users, e.g. at least two users. The token generated and cryptographically signed by the authentication server and received by the mobile device. The token can be in a format according to JWT (JSON (JavaScript Object Notation) Web Token). As mentioned above, the authentication server can be a single sign-on server. The one or more access groups may also be used for access to computer-based assets, such as one or more file system.

The token can have a specific validity time, after which it expires unless it is renewed. Alternatively or additionally, the token has a validity schedule, e.g. that it is only valid between 7 a.m. and 9 p.m. on weekdays (Monday to Friday).

In a store token step 42, the mobile device storing the token in the mobile device.

In an obtain lock id step 44, the mobile device obtains a lock identifier of the lock. This obtaining can be based on short-range wireless communication or by reading an optical code comprising the lock id. When the access control device is implemented in a remote device, e.g. in a server, this step can also comprises obtaining a pointer to the access control device. The pointer can be in the form of a URI (Uniform Resource Indicator). In this case, the lock identifier and the URI can be separate data items. Alternatively, the lock identifier is included in the URI, e.g. as a HTTP (Hypertext Transfer Protocol) GET parameter, in which case the URI is specific for the particular lock.

In a transmit access request step 46, the mobile device transmits an access request to an access control device. The access request comprises the token and the lock identifier.

In an execution sequence separate from steps 40-46, the following steps are optionally performed. The separation of execution sequences can be implemented e.g. using separate threads, processes or even separate hardware processors.

In an optional conditional soon invalid step 47, the mobile device determines if the validity time of the token is about to expire. For instance, remaining validity time can be compared to a threshold duration, whereby the token is determined to be invalid soon if the expiry time is less than the threshold duration. If it is determined that the token is invalid soon, the method proceeds to an optional renew validity step 48. Otherwise, the optional conditional soon invalid step 47 is re-executed, optionally after a wait time (not shown). It is to be noted that the optional conditional soon invalid step 47 can be implemented by polling or trigger-based determination.

In an optional renew validity step 48, the mobile device renews validity of the token. This is performed in communication with the authentication server 5. The renew process is quicker and less resource demanding than re-executing the authenticate step 40

Using the embodiments presented herein where a token and lock id is used for access determination by the access control device, access rights for a user using a mobile device is managed by the authentication server. As described above, the authentication server can be a server that is also used for access to computer network related infrastructure, such as corporate network logins and servers. These embodiments allow the role of the authentication server to seamlessly expand into physical access.

When applied e.g. for a company with both network access and physical access (to office spaces, etc.), management of physical access is both intuitive and simple. Each access group can then be used both for user access to physical assets and computer-based assets. For instance, a user of an access group 'employees' will need access to both a corporate computer network and to an office location. Finer granularity is easily managed with additional access groups. For instance, a user of an access group 'IT department' can be given access to more network resources as well as a server room. Both of these resources should be accessible to all members of the 'employees'. The user of the access group 'IT department' can of course also be a member of the access group 'employees'.

If a user leaves the organisation (e.g. if an employee quits), all types of access rights are conveniently and securely revoked in one system.

The lock does not need to store anything regarding users or access rights. This improves security since even if a hacker were to gain access to the lock, access rights are not managed there.

Figure 4:
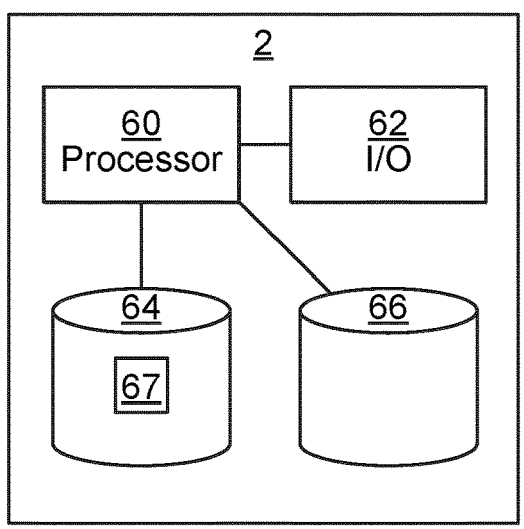
FIG. 4 is a schematic diagram illustrating components of the mobile device of FIG. 1 according to one embodiment.

FIG. 4 is a schematic diagram illustrating components of the mobile device 2 of FIG. 1 according to one embodiment. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 3 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The mobile device 2 further comprises an I/O interface 62 for communicating with external and/or internal entities. Optionally, the I/O interface 62 also includes a user interface.

Other components of the mobile device 2 are omitted in order not to obscure the concepts presented herein.

Figure 5:
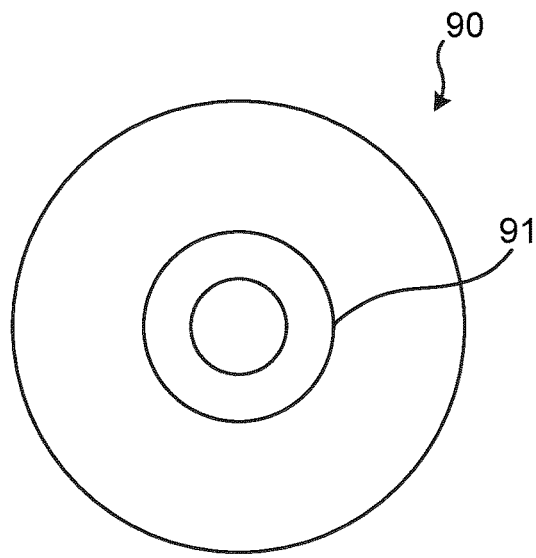
FIG. 5 shows one example of a computer program product comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for requesting access to a physical space secured by a lock, the method being performed in a mobile device of a user and comprising:
   authenticating the mobile device with an authentication server, resulting in a token, being a data item, indicating one or more access groups to which the user belongs, wherein the token is cryptographically signed by the authentication server;
   storing the token in the mobile device;
   obtaining a lock identifier of the lock; and
   transmitting an access request to an access control device, the access request comprising the token and the lock identifier;
   wherein each of the one or more access groups are mapped to one or more lock identifiers; and
   wherein the one or more access groups are configured to be extracted from the token by the access control device and access is granted in response to the access request when the lock identifier of the access request is mapped to at least one of the one or more access groups.

2. The method according to claim 1, wherein at least one of the one or more access groups is associated with at least one computer-based asset.

3. The method according to claim 1, wherein the token comprises a validity time of the token.

4. The method according to claim 3, further comprising renewing, in communication with the authentication server, validity of the token prior to the validity time of the token expiring.

5. The method according to claim 1, wherein authenticating comprises receiving user input for authentication data and providing the authentication data to the authentication server.

6. The method according to claim 5, wherein the user input comprises a password.

7. The method according to claim 1, wherein authenticating comprises collecting biometric data of the user.

8. The method according to claim 1, wherein the authentication server is a single sign-on server.

9. The method according to claim 1, wherein the token is in a format according to JavaScript Object Notation Web Token, JWT.

10. The method according to claim 1, wherein obtaining a lock identifier is based on short-range wireless communication.

11. The method according to claim 1, wherein obtaining a lock identifier comprises obtaining a pointer to the access control device.

12. A mobile device for requesting access to a physical space secured by a lock, the mobile device being associated with a user and comprising:
   a processor; and
   a memory storing instructions that, when executed by the processor, cause the mobile device to:
      authenticate the mobile device with an authentication server, resulting in a token being a data item indicating one or more access groups to which the user belongs, wherein the token is cryptographically signed by the authentication server;
      store the token in the mobile device;
      obtain a lock identifier of the lock; and
      transmit an access request to an access control device, the access request comprising the token and the lock identifier;
   wherein each of the one or more access groups are mapped to one or more lock identifiers; and
   wherein the one or more access groups are configured to be extracted from the token by the access control device and access is granted in response to the access request when the lock identifier of the access request is mapped to at least one of the one or more access groups.

13. The mobile device according to claim 12, wherein at least one of the one or more access groups is associated with at least one computer-based asset.

14. The mobile device according to claim 12, wherein the token comprises a validity time of the token.

15. The mobile device according to claim 14, further comprising instructions that, when executed by the processor, cause the mobile device to renew, in communication with the authentication server, validity of the token prior to the validity time of the token expiring.

16. The mobile device according to claim 12, wherein instructions to authenticate comprise instructions that, when executed by the processor, cause the mobile device to receive user input for authentication data and provide the authentication data to the authentication server.

17. The mobile device according to claim 16, wherein the user input comprises a password.

18. The mobile device according to claim 12, wherein the instructions to authenticate comprise instructions that, when executed by the processor, cause the mobile device to collect biometric data of the user.

19. The mobile device according to claim 12, wherein the authentication server is a single sign-on server.

20. The mobile device according to claim 12, wherein the token is in a format according to JavaScript Object Notation Web Token, JWT.

21. The mobile device according to claim 12, wherein the instructions to obtain a lock identifier comprise instructions that, when executed by the processor, cause the mobile device to obtain the lock identifier based on short-range wireless communication.

22. The mobile device according to claim 12, wherein the instructions to obtain a lock identifier comprise instructions that, when executed by the processor, cause the mobile device to obtain a pointer to the access control device.

23. A non-transitory computer-readable medium comprising a computer program stored thereon for requesting access to a physical space secured by a lock, the computer program comprising computer program code which, when run on a mobile device associated with a user, causes the mobile device to:

authenticate the mobile device with an authentication server, resulting in a token being a data item indicating one or more access groups to which the user belongs, wherein the token is cryptographically signed by the authentication server;

store the token in the mobile device;

obtain a lock identifier of the lock; and transmit an access request to an access control device, the access request comprising the token and the lock identifier;

wherein each of the one or more access groups are mapped to one or more lock identifiers; and wherein the one or more access groups are configured to be extracted from the token by the access control device and access is granted in response to the access request when the lock identifier of the access request is mapped to at least one of the one or more access groups.

* * * * *